(12) United States Patent
Cummings et al.

(10) Patent No.: US 8,352,645 B2
(45) Date of Patent: Jan. 8, 2013

(54) SINGLE POINT, DEVICE DRIVEN DATA TRANSMISSION FOR A REAL TIME APPLICATION

(75) Inventors: Rodney W. Cummings, Austin, TX (US); William R. Pitts, Coupland, TX (US); Matthew M. Brzezinski, Austin, TX (US); Eric L. Singer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 387 days.

(21) Appl. No.: 12/472,605

(22) Filed: May 27, 2009

(65) Prior Publication Data

US 2010/0257298 A1 Oct. 7, 2010

Related U.S. Application Data

(63) Continuation-in-part of application No. 12/418,261, filed on Apr. 3, 2009, now Pat. No. 8,156,295, and a continuation-in-part of application No. 12/418,131, filed on Apr. 3, 2009, now Pat. No. 8,135,879.

(51) Int. Cl.
*G06F 13/28* (2006.01)

(52) U.S. Cl. ......................................................... 710/22
(58) Field of Classification Search ...................... 710/22
See application file for complete search history.

(56) References Cited

U.S. PATENT DOCUMENTS

| 5,686,917 | A | 11/1997 | Odom et al. |
| 6,728,795 | B1 | 4/2004 | Farazmandnia et al. |
| 6,728,839 | B1 * | 4/2004 | Marshall ........................ 711/137 |
| 6,732,255 | B1 | 5/2004 | Ling et al. |
| 6,813,652 | B2 | 11/2004 | Stadler et al. |
| 6,941,390 | B2 | 9/2005 | Odom |
| 7,191,257 | B2 * | 3/2007 | Ali Khan et al. ................ 710/22 |
| 7,240,231 | B2 | 7/2007 | Conway |
| 7,290,069 | B2 | 10/2007 | Curtis |
| 7,542,867 | B2 | 6/2009 | Steger et al. |
| 2004/0215270 | A1 * | 10/2004 | Ritscher et al. .................. 607/27 |
| 2006/0232287 | A1 * | 10/2006 | Stemer et al. .................. 324/754 |

OTHER PUBLICATIONS

H.R. Simpson; "Four-Slot Fully Asynchronous Communication Mechanism"; IEEE Proceedings, vol. 137, No. 1, Jan. 1990; 14 pages.

John Rushby; "Model Checking Simpson's Four-Slot Fully Asynchronous Communication Mechanism"; CSL Technical Report; Jul. 3, 2002; 45 pages.

(Continued)

*Primary Examiner* — Henry Tsai
*Assistant Examiner* — Juanito Borromeo
(74) *Attorney, Agent, or Firm* — Meyertons Hood Kivlin Kowert & Goetzel, P.C.; Jeffrey C. Hood; Joel L. Stevens

(57) ABSTRACT

Device driven transfer of data from the device to a memory of a host. The device may receive data from one or more data sources. The device may transfer at least a portion of the data to the memory of the host coupled to the device. Transferring may be performed without an initiation of the transfer by the host. Additionally, transferring may include, for each of the one or more data sources, determining a portion of the memory medium corresponding to the data source, determining a latest value for the data source from the data, and storing the latest value for the data source in the portion of the memory. Storing the latest value may include overwriting a previous value of the data source when the previous value exists in the portion of the memory medium.

24 Claims, 12 Drawing Sheets

OTHER PUBLICATIONS

U.S. Appl. No. 12/418,131, entitled "Four-Slot Aysnchronous Communication Mechanism with Increased Throughput", by Rodney W. Cummings and Eric L. Singer, filed Apr. 3, 2009.

U.S. Appl. No. 12/418,261, entitled "Four-Slot Asynchronous Communication Mechanism with Decreased Latency", by Eric L. Singer, filed Apr. 3, 2009.

* cited by examiner under certain circumstances, including for example when the host's reading rate is different from the client's writing rate, the operations can still overlap for a given slot, so data incoherence is still possible. A four-slot solution was proposed by H. R. Simpson (Four-slot fully asynchronous communication mechanism, published in the IEE Proceedings, Vol 137, Pt. E, No 1, January 1990, which is hereby incorporated by reference as though fully set forth herein).

SINGLE POINT, DEVICE DRIVEN DATA TRANSMISSION FOR A REAL TIME APPLICATION

PRIORITY

This application is a continuation-in-part of U.S. patent application Ser. No. 12/418,261 titled "Four-Slot Asynchronous Communication Mechanism with Decreased Latency," filed Apr. 3, 2009 now U.S. Pat. No. 8,156,295, whose inventor is Eric L. Singer, which is hereby incorporated by reference in its entirety as though fully set forth herein.

This application is also a continuation-in-part of U.S. patent application Ser. No. 12/418,131 titled "Four-Slot Asynchronous Communication Mechanism with Increased Throughput," filed Apr. 3, 2009 now U.S. Pat. No. 8,135,879, whose inventor is Eric L. Singer, which is hereby incorporated by reference in its entirety as though fully set forth herein.

FIELD OF THE INVENTION

The present invention relates generally to computer systems and more particularly to a system and method for transferring data from a client device to a host system.

DESCRIPTION OF THE RELEVANT ART

Direct Memory Access (DMA) is a process by which a DMA subsystem within or coupled to a computer system (host) can access system memory for reading and/or writing independently of the system's central processor. This leaves the system processor free to perform other tasks. Similarly, if the DMA subsystem is in an embedded system with its own embedded processor, DMA may allow the embedded processor to continue with its specific function without diverting unnecessary resources to transferring data to or from the host. This can be particularly useful in real-time computing situations.

DMA can be initiated on the host side ("pull DMA"), e.g., where the host system initiates the DMA to transfer data from the client to the host, or on the client side ("push DMA"), e.g., where the client initiates the DMA to transfer data from the client to the host. Additionally, in some cases, it may be possible that the DMA subsystem is located either on the host side (e.g., where the host retrieves data from the client), or on the client side (e.g., where the client sends data to the host)

When the host desires to read the data that is being written by the client in real time, there is a coherency issue that must be solved. Specifically, if the host were to read the data while the client were writing the data, the host could read partially old data (e.g., a combination of partially new and partially old data), and therefore potentially incoherent data. Thus, a mechanism to ensure the coherency of the data is required.

One approach to this involves locking. In this case the client or the host may set a 'lock' when performing a read or write operation, such that the other side cannot access the data until the read or write operation is complete. However, locks can cause timing interference, including jitter, latency, and priority inversion.

Some alternatives to locking have been suggested. So-called 'lock-free algorithms' do not use synchronization primitives (i.e. locking), instead often using, for example, Compare-and-Swap instructions in the polling loop. A further requirement can be made that all operations be completed in a finite number of steps; such algorithms are known as 'wait-free algorithms'. Wait-free algorithms are also necessarily lock-free.

One such solution involves having multiple data slots at each host memory address; in theory, this allows the host to read the most-recently-completely-written data from one slot while the client may write to a different slot. Various two- and three-slot algorithms have been attempted. However, under certain circumstances, including for example when the host's reading rate is different from the client's writing rate, the operations can still overlap for a given slot, so data incoherence is still possible. A four-slot solution was proposed by H. R. Simpson (Four-slot fully asynchronous communication mechanism, published in the IEE Proceedings, Vol 137, Pt. E, No 1, January 1990, which is hereby incorporated by reference as though fully set forth herein).

This four-slot algorithm successfully provides a guaranteed-coherent, fully asynchronous, wait-free communication mechanism. However, this method does require significant communication overhead to ensure full asynchronicity and data coherence. According to this four-slot algorithm, the writing device must perform one read from the host and two writes to the host for each actual data transfer. This can reduce the overall throughput and increase the latency of the data transfer, especially when performed over a high-latency bus (such as PCI, or PCI-Express). Thus, improvements in the field are desired.

SUMMARY OF THE INVENTION

Various embodiments are presented of a system and method for device driven transfer of data from a device to a host.

The device may receive data from one or more data sources. The one or more data sources may be sensors or individual streams of data, e.g., for a real time application. In various embodiments, the device may be implemented as a peripheral component interconnect (PCI) card, e.g., in a chassis or the host. Alternatively, or additionally, the device may be a controller area network (CAN) device or a FlexRay device, as desired. For a CAN device or FlexRay device, the data sources may be network frames sent by other devices on the network, e.g. for a real-time application. Other types of devices or implementations are envisioned.

Accordingly, the device may transfer at least a portion of the data to a memory medium of the host coupled to the device. Transferring may be performed in a device driven manner, e.g., without an initiation of the transfer by the host. Additionally, the transfer of data may be performed using direct memory access (DMA). Note that mapping shared memory from a peripheral component interconnect (PCI) device into the memory medium of a host may not apply, as the host must initiate a transfer on PCI in order to read that shared memory.

More specifically, the device transferring the data may include, for each of the one or more data sources, determining a portion of the memory medium corresponding to the data source. A latest value for the data source may be determined from the received data. Finally, the latest value for the data source may be stored in the determined portion of the memory medium. In various embodiments, storing the latest value may include overwriting a previous value of the data source when the previous value exists in the portion of the memory medium.

Storing the data may be performed at least two times before the host reads the latest value for the at least one data source. Thus, the host may only be interested in the latest data point at the time of the read, and may not be interested in all of the provided stream of data values. Such embodiments may be referred to as "single point" embodiments, as the host may only be interested in the latest, single point of data for a given data source. Note that storing the data may utilize a four slot data structure in the memory medium of the host, e.g., to ensure data coherency and determinism.

Thus, the method described above may be performed a plurality of times, e.g., in an iterative fashion, possibly for a real time application.

BRIEF DESCRIPTION OF THE DRAWINGS

A better understanding of the present invention can be obtained when the following Detailed Description of the Embodiments is read in conjunction with the following drawings, in which.

Figure 1A:
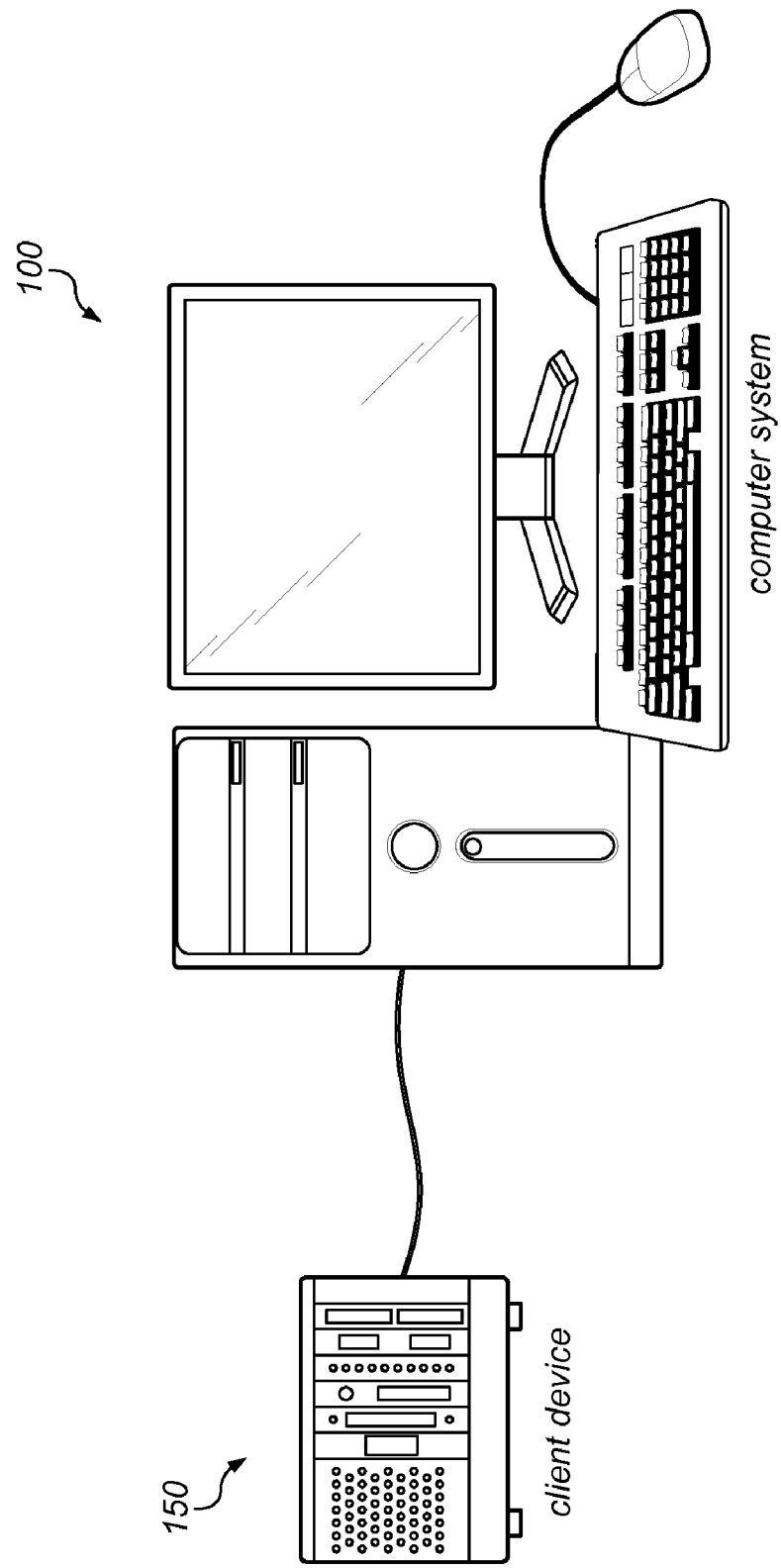
FIGS. 1A and 1B depict a host system and a client device according to various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition (DAQ) devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

Communication Device includes cards, modules, boxes, and any of various types of devices that communicate over a network, bus, ring, star or other cable topology. A communication device may also optionally be further operable to analyze or process the acquired or stored communication data. Examples of a communication device include a card that uses peripheral component interconnect (PCI) for coupling to a host Computer System, and connects to Controller Area Network (CAN) for communication with external devices on the CAN bus. Additional examples include a PCI card (e.g., including PCI Express) for other embedded network protocols, such as FlexRay or Local Interconnect Network (LIN). Additional examples also include a PCI card for industrial communication protocols, such as CANopen, DeviceNet, PROFIBUS, PROFINET, Ethernet/IP, EtherCAT, and so on. Additional options for coupling to the host Computer System include PCI eXtensions for Instrumentation (PXI) (e.g., including PXI express).

A communication device may be further operable to perform control functions, e.g., in response to analysis of the acquired or stored data. For example, the communication device may send a control signal to an external system, such as a motion control system or to a sensor, in response to particular data. A communication device may also be operable to perform automation functions, i.e., may receive and analyze data, and issue automation control signals in response.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Functional Unit—may include a processor and memory or a programmable hardware element. The term "functional unit" may include one or more processors and memories and/or one or more programmable hardware elements. As used herein, the term "processor" is intended to include any of types of processors, CPUs, microcontrollers, or other devices capable of executing software instructions.

Real Time Application—may refer to software program(s) that are subject to real time constraints, e.g. operational deadlines from event to system response. For example, the real time application may execute a real time loop that iterates, e.g., once every 1 millisecond. Within each iteration of the loop, the code typically executes to read input data sources (events), perform calculations on those inputs, and write the resulting output data (system response). Since the loop executes under tight timing constraints, it is desirable to read the input data sources as quickly as possible.

Figure 1B:
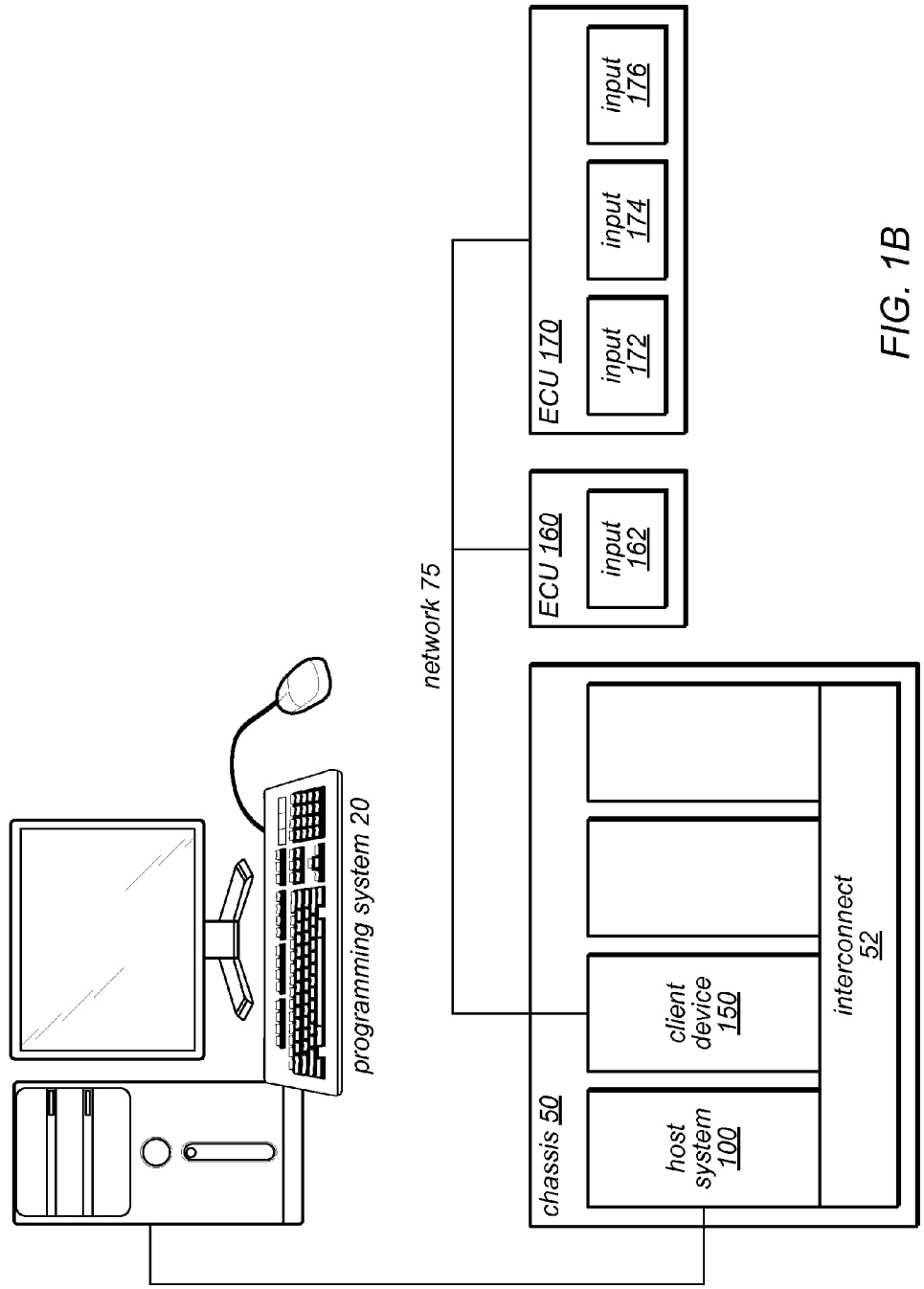

FIGS. 1A and 1B—Exemplary Host System and Client Device

FIG. 1A illustrates a host system 100 (or simply "host") that is coupled to a data acquisition or measurement device (referred to herein as "client device") 150 according to one embodiment. The client device 150 measures or otherwise receives data that is provided to the host system 100. As shown in FIG. 1A, the host system 100 may be a computer system. The host system 100 may include a display device operable to display a program (e.g., a graphical user interface to the program) as the program is created and/or executed as well as various input devices. The graphical user interface may comprise any type of graphical user interface, e.g., depending on the computing platform.

The host system 100 may include at least one memory medium on which one or more computer programs or software components according to one embodiment of the present invention may be stored. The memory medium may also store operating system software, as well as other software for operation of the computer system. The computer system may additionally have one or more hardware components. In some embodiments, the computer system may include one or more DMA subsystems, e.g., for transferring data from a client device to the computer system. However, in other embodiments, the computer system may not include a DMA subsystem, but instead the may be included in the client device 150.

The client device 150 may be a measurement device. The client device 150 may include a chassis, for example a PCI or a PXI chassis. The chassis may include one or more slots which may be configured to receive a corresponding one or more pluggable cards. For example, the cards may be any of various types, e.g., cards for controlling or interacting with instruments or devices, I/O cards for receiving and/or manipulating data, computer cards (e.g., including a processor and memory medium or configurable hardware unit) which may be configured to perform computational functions, and/or other types of cards, as desired. One or more of the plurality of cards may include a configurable or programmable hardware element which may be configured to perform one or more functions.

The chassis may include a backplane. In some embodiments, the backplane may include a programmable hardware unit, such as a field programmable gate array (FPGA), which may be usable for configuring the chassis to perform one or more functions (e.g., using a subset or all of a plurality of cards inserted into the chassis).

The backplane may provide one or more busses, e.g. PCI or PXI busses, for communicating with (and between) the plurality of cards. The host system 100 may be usable to configure and/or control the chassis. For example, the host system 100 may be used to configure one or more of the cards inserted in the chassis. In further embodiments, as indicated above, the backplane of the chassis may include a configurable hardware unit (e.g., an FPGA), and the host system 100 may be usable to configure the programmable hardware unit (e.g., with a graphical program, such as one created using LabVIEW® provided by National Instruments Corporation, as is described in U.S. Pat. No. 6,219,628 B1, whose title was "System and Method for Configuring an Instrument to Perform Measurement Functions Utilizing Conversion of Graphical Programs into Hardware Implementations", and whose authors were Jeffrey L. Kodosky, Hugo Andrade, Brian K. Odom, and Cary P. Butler, and which is hereby incorporated by reference as though fully set forth herein). Thus, the host system 100 may be usable to control or configure the chassis to perform one or more functions (e.g., industrial or measurement functions).

Embodiments of the present invention may be involved with performing test and/or measurement functions; controlling and/or modeling instrumentation or industrial automation hardware; modeling and simulation functions, e.g., modeling or simulating a device or product being developed or tested, etc.

In some embodiments, as indicated above, the client device may include a DMA subsystem, e.g., for transferring data from the client to the host. However, in other embodiments, e.g., if the host includes a DMA subsystem for transferring data from the client to the host, the client device may not include a DMA subsystem. In some embodiments, both the client and the host may include DMA subsystems.

It is worth noting that while FIG. 1A depicts the client device 150 as physically distinct and separated from the host system 100, various embodiments are also possible where the client device 150 is located in the same chassis or case as the host 100. Generally speaking a "client device" (or simply "client") 150 may be any hardware subsystem which may be coupled to a computer system and capable of communicating data to the host system 100 and should not be limited only to the client devices depicted or described above. Further worth noting is that while FIG. 1A shows one (1) client device coupled to one (1) host system, other embodiments with different numbers of either clients devices, host systems, or both, are also envisioned.

FIG. 1B illustrates an alternate embodiment of a system including the host system 100 and the client device 150. In this embodiment, the client device 150 may receive frames of network data that are provided to the host system 100. The host system 100 may execute a real time application. The real time application reads and writes data to the client device 150 as well as any other coupled devices. The host system 100 and client device 150 may be included within a chassis 50, for example a PCI or a PXI chassis. As indicated above, the chassis may include one or more slots which may be configured to receive a corresponding one or more pluggable cards.

Within FIG. 1B, the host system 100 is shown as a computer card in the first (left-most) slot of the chassis 50. The client device 150 is shown as the communication device in the second slot of the chassis 50.

Similar to above, the chassis 50 may include a backplane, shown in FIG. 1B as interconnect 52. In some embodiments, the backplane may be a PCI or PXI interconnect. In some embodiments, the backplane may include a programmable hardware unit, such as a field programmable gate array (FPGA), which may be usable for configuring the chassis to perform one or more functions (e.g., using a subset or all of a plurality of cards inserted into the chassis). The interconnect 52 may provide one or more busses, e.g. PCI or PXI busses, for communicating with (and between) the plurality of cards.

As shown in FIG. 1B, the host system 100 may be coupled to a general-purpose computer used as a programming system 20. The programming system 20 may be a computer system as described in the definition of terms. The programming system 20 may include a display device operable to display a program (e.g., a graphical user interface to the program) as the program is created. The graphical user interface may comprise any type of graphical user interface, e.g., depending on the computing platform. When a real-time application executes on the host system 100, this application may be downloaded from programming system 20 to the host system 100. In some embodiments, the programming system 20 and host system 100 may be coupled using TCP/IP. Embodiments are also possible where the programming system 20 and host system 100 are included within the same computer card (e.g., one processor core for programming system, and another processor core for real time host system).

In the embodiment shown in FIG. 1B, the client device 150 may be coupled to Electronic Control Units (ECUs) (shown as 160 and 170). Each ECU may include a functional unit that performs a real time control function. The network 75 that connects the client device 150 to the ECUs may be a bus such as controller area network (CAN) or FlexRay. The ECUs may be physically contained within a unit under test, such as a vehicle or car, or the ECUs may be located in a laboratory for test purposes.

Within each ECU, input and output ports are shown for the purpose of an exemplary system for performing a real time application involving a vehicle. In this example, the host system 100 may execute a simulated model of a cruise control system in the vehicle. The cruise control system takes inputs from the driver to enable, disable, increase speed, decrease speed, and so on. The cruise control system may communicate over the vehicle's CAN network to read current vehicle speed, and to change the vehicle's throttle position (acceleration). The host system 100 may perform a real time simulation of the cruise control algorithm, e.g., in order to validate it for eventual use within the vehicle. For the example, ECU 160 measures current vehicle speed using a sensor, and this current vehicle speed is shown as input 162. When ECU 160 measures a new speed value, it sends the data of input 162 in a CAN frame, and input 162 is received by the client device 150. For the example, ECU 170 measures the current position of the brake pedal (input 172) and accelerator pedal (input 174), and ECU 170 controls an actuator for throttle position (output 176). The brake pedal and accelerator pedal inputs are used to disable the cruise control in the host system 100, in order for the driver to take control of the vehicle speed. The throttle position is used by the cruise control simulation to increase or decrease the speed of the vehicle.

Many of the embodiments described herein may include transferring data (e.g. acquired in performing test and/or measurement functions) from the client to the host, for example may include transferring the latest data acquired to a data structure on the host according to one or more embodiments of the present invention. For example, the client may "push" acquired data, e.g., using DMA, to a memory medium of the host. However, in some embodiments, the host may only need the latest information, and therefore may not need all of the acquired data. Such embodiments may be referred to as "single point" as only the latest single point of data may be required by the host at any given time. However, the host may read data from its host memory that has been acquired from the communication device for a plurality of different functions or hardware, and may thus require a plurality of different "single points" of data. Thus, whenever new data is pushed from the client, it may be stored in a particular portion of the host memory corresponding to the device or function from which the data was received. In these cases, any previous point of data may be overwritten with the newest data for that particular device or function. Thus, various embodiments described herein may relate to device driven data storage (of only the most recent data) in a host's memory (e.g., using DMA). Such embodiments may be particularly applicable to real time applications executing on the host.

Using the vehicle example indicated above as a reference, input 162 (vehicle speed), input 172 (brake pedal), and input 174 (accelerator pedal) each represent a "single point" of data (even though there may be a stream of such single points from a data source). Each of these three input data sources may be stored in a dedicated portion of the host memory. In one embodiment, when ECU 160 transmits input 162 on network 75 (e.g. CAN), the client device 150 receives that data, and then "pushes" the data to the host system 100, e.g., using DMA. This transfer may be initiated entirely by the client device 150, so that it has little impact on the real time simulation of the cruise control algorithm running on host system 100. The same technique may be used when ECU 170 transmits input 172 or input 174 on network 75. The real time simulation on the host system 100 may read these inputs within a real time loop (e.g., iterating once every 1 millisecond). Within each iteration of the real time loop, the inputs as passed into the simulated cruise control algorithm, which then calculates a new value for output 176 (throttle). The new value for output 176 may be provided or written to client device 150, which may send the data over network 75 to ECU 170 to control the vehicle's actuator for the throttle.

Figure 2:
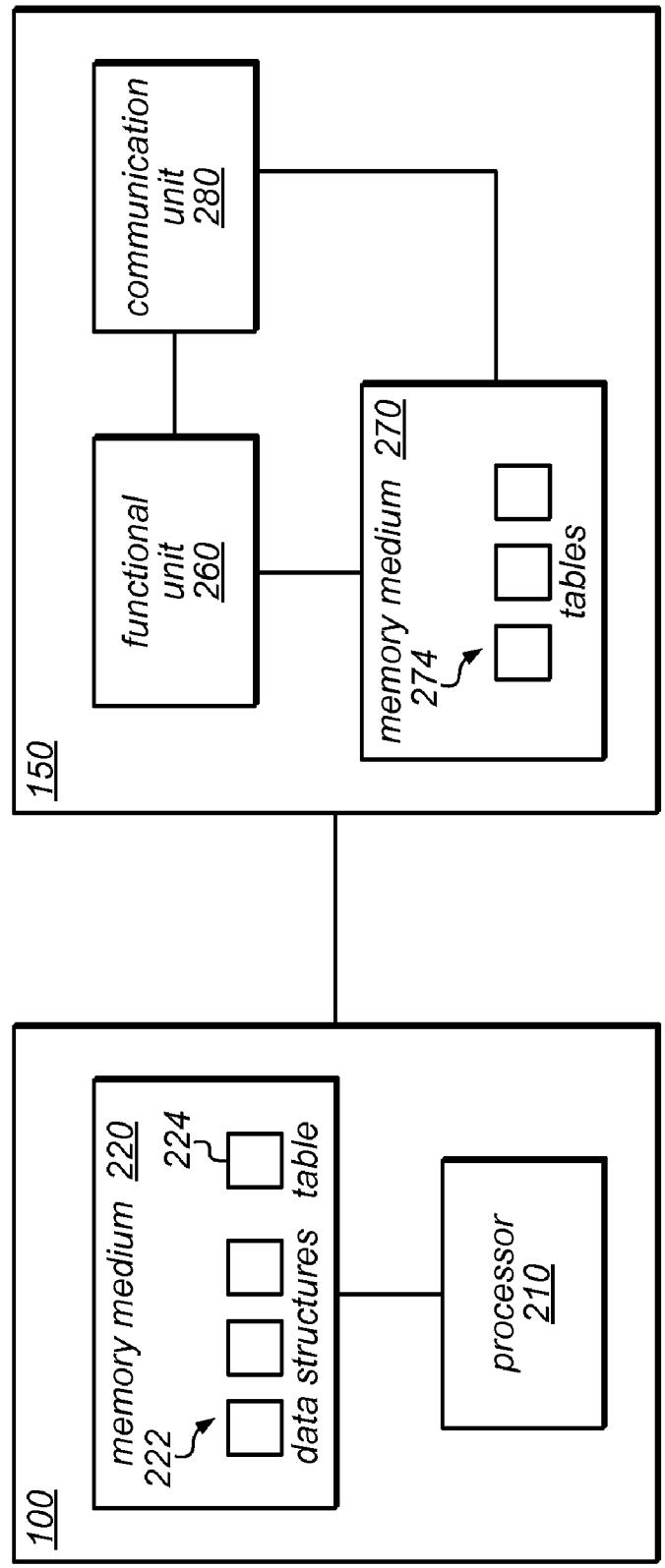
FIG. 2 is an exemplary block diagram of a host system and a client device according to one embodiment.

FIG. 2—Exemplary Block Diagram of a Host System and a Client Device

FIG. 2 depicts a block diagram of a host system 100 coupled to a client device 150 according to one embodiment. As shown, the host 100 may include at least a processor 210 and a memory medium 220. The host may also include additional components, for example the host may be a host system 100 as depicted in FIG. 1B and described above. The host 100 may additionally be coupled to one or more other devices in some embodiments, e.g. other client devices and/or other host systems.

The memory medium 220 of the host 100 may include one or more data structures 222 according to various embodiments. A data structure 222 as used herein may refer to a specific structure in which data may be stored, to which data may be written, and/or from which data may be read. The data structure 222 may be used by the host system 100 to read the most recent data in the data structure 222, following the "single point" embodiments indicated above.

As one example, the data structure 222 may have four "slots", which may be divided into two pairs of slots. Thus each slot may be distinguishable, e.g., with a two-bit label designating the pair of slots and the slot within the pair of slots. Thus, the host 100 or the client 150 may be able to specify a specific slot within a given data structure 222 to write to or to read from, and may be able to maintain information relating to the reading or writing status of each slot of a given data structure 222. It should be noted that in some embodiments the four slots may not simultaneously contain useful data; rather, there may be four slots in each data structure 222 primarily for the purpose of ensuring that the communication mechanism is fully deterministic for asynchronous communication and that the data transferred is always fully coherent. Thus, the host system 100 may only need the most recent data (e.g. in the most recently written data slot) in a given data structure 222 at any one time.

The data structure 222 may further include one or more "headers", which may indicate some specific information about the slots of the given data structure. For example, the data structure 222 might include "reading" information, indicating which pair of slots has been most recently read from. The memory medium on the host may also or alternatively include one or more tables 224 of information. For example, there may be a plurality of similar data structures 222 in the host's memory medium 220, and rather than storing the "reading" information for each data structure 222 as a header of that data structure, the "reading" information may all be stored in a single table 224, such that the "reading" information for a given data structure may be separate from but still associated with the given data structure 222. More detailed description of the information that may be stored on the host memory medium is provided below in the context of the various embodiments involved.

The client device 150 may include at least a functional unit 260 and a memory medium 270. As defined above, a functional unit 260 may include a processor and a memory medium, or may include a programmable hardware element, or may include a combination of such elements, which may be configurable to perform one or more embodiments of the present invention. In some embodiments, e.g. when the functional unit 260 is a processor and a memory medium, the memory medium of the functional unit and the memory medium 270 shown in FIG. 2 may be the same memory medium, e.g. there may only be one memory medium 270 on the client side. In addition, there may be one or more communication units 280 or other means of communicating on a network coupled to the client device 150. The client device 150 may additionally be coupled to one or more other devices in some embodiments. Alternatively, the client device may be coupled only to the host system 100 and may not be configured to acquire data independently from the host 100. As described herein, the client device 150 may be configured to "push" received data to the memory medium 220 of the host device 100.

The memory medium 270 on the client device 150 may include information corresponding to one or more data structures 222 on the host 100. In embodiments corresponding to the four slot mechanisms described herein, for example, the client memory medium 270 may include information for each data structure 222 on the host memory medium 220 indicating which pair of slots has been written to most recently, which slot of each pair has been written to most recently, and/or which pair of slots has been read from most recently. In some embodiments, the client memory medium 270 may include information indicating the potential validity or invalidity of some or all of the information corresponding to the one or more data structures on the host. More detailed description of the information that may be stored on the client memory medium is provided below in the context of the various embodiments involved.

The client 150 may be coupled to the host 100 such that data may be transferred in either direction, e.g. from the host 100 to the client 150 or from the client 150 to the host 100.

Figure 3:
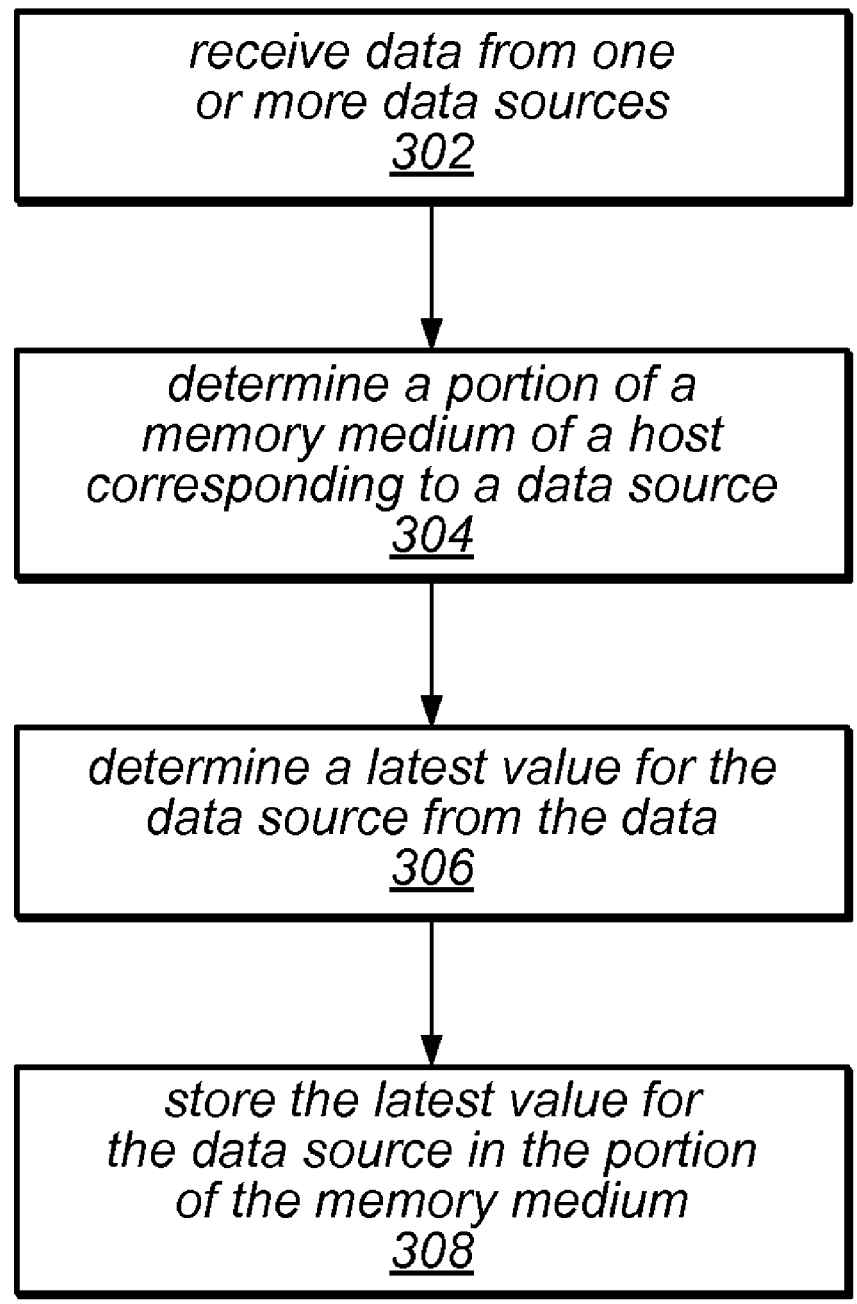
FIG. 3 is a flowchart diagram illustrating a method for a client to transfer data to a host according to one embodiment.

FIG. 3—Method for a Client Device to Transfer Data to a Host

FIG. 3 is a flowchart diagram of a method for a client device to transfer data to a host according to one embodiment. The method of FIG. 3 may be used in conjunction with any of the systems or methods described herein. Various described steps may be modified, omitted, or performed in a different order, as desired.

In 302, a device 150 (e.g., the client device described above) may receive data from one or more data sources. As noted above, the device 150 may be implemented on a PCI card, e.g., in a chassis, or possibly a host system (e.g., the host system described above) coupled to the device 150. Additionally, the device 150 may be a CAN device or FlexRay device, among other possibilities.

As indicated above, the device 150 may receive data from one or more data sources. The data sources may each correspond to different physical devices, such as electronic control units (ECUs) or sensors, but may also generally refer to various different parameters or functions of a measurement application. Each physical device on the network may provide multiple distinct data sources, e.g., as described in the vehicle example of FIG. 1B. Such data points may be received separately, e.g., from separate corresponding ECUs or sensors of the vehicle, may be received from a single source. In some embodiments, as indicated in FIG. 1B, the data points may be received over a common port, such as an Ethernet port. For example, the device 150 may receive a plurality of labeled data packets, e.g., in a stream, each of which may correspond to a data source of a plurality of data sources, as desired. The data packets may be labeled, e.g., each using a header of the data packet, as desired.

Figure 4:
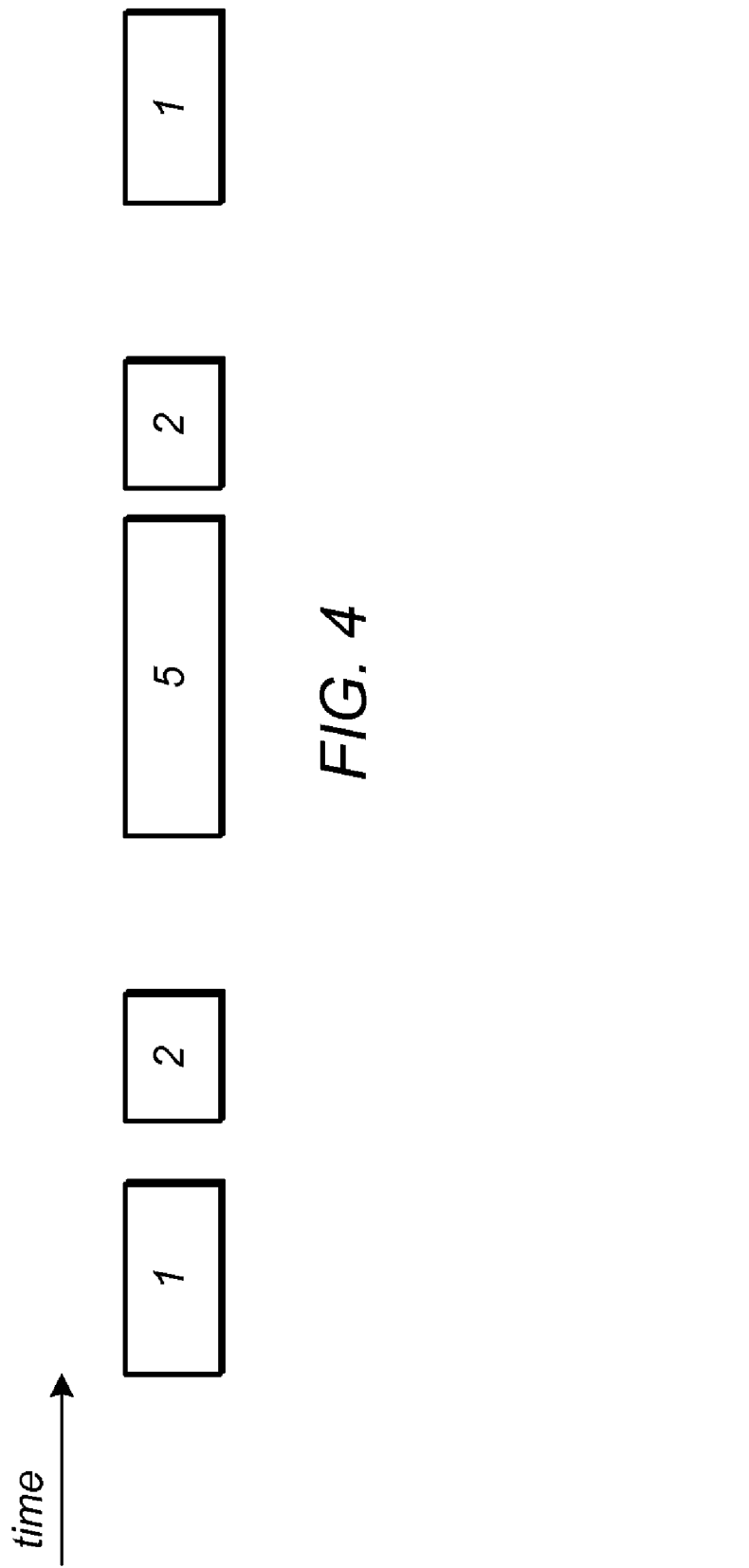
FIG. 4 illustrates an exemplary stream of data from a plurality of data sources, according to one embodiment.

FIG. 4 provides an exemplary stream of data which may be received by the device. As shown, as time passes, the device 150 may receive data (e.g., a packet of data, or sets of packets of data) from data source 1, data from data source 2, data from data source 5, data from data source 2, and data from data source 1. Thus, in 302, data which corresponds to one or more data sources may be received.

The device 150 may transfer at least a portion of the data to a memory medium of the host 100 coupled to the device 150. Steps 304, 306, and 308, described below may be performed for each data source, based on the received data in 302.

More specifically, in 304, the method (e.g., the device) may determine a portion of the memory medium of the host 100 which corresponds to a data source. According to various embodiments, a lookup table or other mechanism for determining memory locations for particular data may be used. Thus, the device may determine that data for data source 1, for example, is stored in a particular data structure (which may be a four slot data structure, as described herein).

In 306, the method (e.g., the device 150) may determine a latest value for the data source from the data. In various embodiments, such a determinism may be trivial or complex depending the implementation or embodiment used. For example, where data is transferred (in 308) as soon as it arrives, the latest value may simply be the only value available. However, where more than one set of data is received from a data source before it is transferred, the latest set of that data may be identified for transfer, and the other may be discarded (e.g., in the case where the host is only interested in the latest value, instead of the stream of values), as desired. For example, the device 150 may receive data and store the data in local data structures for later transfer to the host 100.

In such embodiments, the device 150 may continuously overwrite the previous values for a data source each time a new value is received, and correspondingly, the determination of the latest value may simply be based on the value that is currently stored in the local data structure corresponding to the data source in question. Thus, in some embodiments, the device 150 may sort the received data and store the latest data for each data source in local memory, thus identifying the latest value for each data source.

However, it should be noted that 306 may not be performed and may be removed entirely. As indicated above, for example, a transfer of data may be performed (e.g., as described in 308 below) any time new data is received, and therefore no actual determination of a latest value may be necessary. In further embodiments, a transfer of data for all data sources may be performed each time new data is received, and correspondingly, some data point values may not have changed on the transfer for various ones of the data sources.

In 308, the latest value for the data source may be stored in the portion of the memory medium. The transfer of data may be performed without an initiation by the host—in other words, the transfer of data may be performed in a device-driven manner. In some embodiments, the transfer of data may be performed without the host processor being involved at all, e.g., using direct memory access (DMA). Thus, the device 150 may provide data for each of the data sources to the host memory, thereby enabling the host to access the data in a more efficient manner when the data is needed. As indicated above, the host may only be interested in the most recent data point for each data source at the time of a host read (which may be performed by the host 100 in a looping or iterative fashion, e.g., every 1 ms, 10 ms, 1 s, 10 s, 30 s, 1 m, etc.). Accordingly, storing the latest value may involve overwriting a previous value of the data source in the particular location of the host memory.

The transfer of data may be immediate (or as soon as possible) between receiving the data in 302 and transferring the data in 308. Thus, in some embodiments, all received data may be passed through the device 150 to the host system 100.

However, in alternate embodiments, the device 150 may send data at particular intervals (e.g., which may be dynamically determined or preconfigured, possibly by a user, as desired). In such embodiments, multiple data points may be received for a data source within an interval. Accordingly, only the latest data point may be transferred to the host 100. Thus, the host 100 may not read every received data point for a given data source, but may instead only read or receive the latest data point upon a host read or transfer of data, as desired. Thus, in such embodiments, where FIG. 4 represents an interval before transfer, the first data source 1 and data source 2 sets of data may be discarded and may not be transferred to the host.

It should also be noted that the host 100 may not read data on every transfer by the device 150. For example, the device 150 may transfer data corresponding to a data source more than once to the host memory before the host 100 performs a read operation. Accordingly, the older data point(s), in such an example, may never be read by the host. The data points may be usable by the host to perform a real time application.

FIGS. 5-13—Exemplary Embodiments

The following descriptions provide various exemplary embodiments related to four slot transfer mechanisms for providing the device driven data transfer described in FIG. 3. However, these embodiments are exemplary only, and various other data structures or methods may be used to implement the transfer and storage of data from the communication device to the memory of the host.

Figure 5:
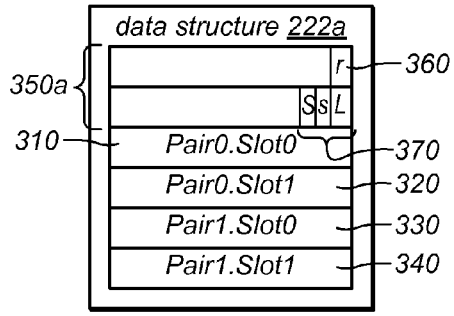
FIG. 5 depicts a representation of a data structure according to one embodiment.

FIG. 5—Data Structure on a Host System According to One Embodiment

FIG. 5 depicts a data structure 222A as might exist in the host memory 220 according to one embodiment. The data structure 222A pictured includes four slots 310, 320, 330, 340, each of which may be designated by a two bit address: the first pair, first slot may be (0,0) 310; the first pair, second slot may be (0,1) 320; the second pair, first slot may be (1,0) 330; and the second pair, second slot may be (1,1) 340. The data structure 222A pictured also includes a header 350A.

The header 350A in this embodiment includes "reading" information 360. "Reading" information 360 as used herein refers to information that indicates, for a given data structure, which pair of slots has been read from most recently, e.g., by the host system 100. The "reading" information may be stored as a single bit, e.g. a '0' for the first pair of slots or a '1' for the second pair of slots. It may also be possible to store the "reading" information 360 as more than one bit.

The header 350A in this embodiment also includes "latest" information 370. "Latest" information 370 as used herein refers to information that indicates, for a given data structure, which pair of slots has been written to most recently, which slot of the first pair of slots has been written to more recently, and which slot of the second pair of slots has been written to more recently, e.g., by the client 150. The "latest" information 370 may be stored as three bits, depicted in FIG. 5 as 'S', 's', and 'L'. For example, 'S' may indicate the slot of the first pair of slots that has been written to more recently; in this case if the 'S' bit read '0', it would indicate that the first slot of the first pair of slots 310 has been written to more recently. The 's' bit may similarly indicate which slot of the second pair of slots has been written to more recently. The 'L' bit may indicate which pair of slots has been written to most recently in a similar manner. Thus in this embodiment, if the 'L' bit reads '1' and the 's' bit reads '0', the "latest" information 370 may indicate that the first slot of the second pair of slots 330 has been written to most recently. Other ways of storing, labeling, and using the "latest" information 370 are also envisioned, for example the "latest" information 370 may include a different number of bits, and/or the meanings of bits reading '1' and '0' may be reversed, among other possibilities.

When the client device 150 uses the 4-slot data structure of FIG. 5 to transfer data using DMA, three separate DMA transfers may be performed. First, the client device 150 may perform a DMA read to obtain the header 250A. The client device may use the bits in header 250A to determine the slot for the new data. Second, the client device 150 may perform a DMA write to transfer the new data to the slot determined by the first step. Third, the client device 150 may perform a DMA write to portion 370 of the header, to update the "latest" information so that the host system 100 can determine the latest data.

Various of the embodiments described below may also refer to "reading" information and "latest" information, such as are described with respect to this data structure. In general, although the way the information is stored may vary in the different embodiments, the meanings of "reading" information and "latest" information may be consistent throughout this section.

Figure 6:
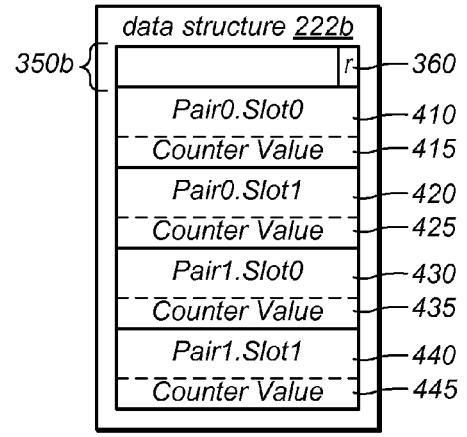
FIG. 6 depicts a representation of a data structure according to one embodiment.

FIG. 6—Data Structure on a Host System According to Another Embodiment

FIG. 6 depicts a data structure 222B according to another embodiment. In the data structure 222B of FIG. 6, there is a header 350B including "reading" information 360 as in the data structure 222A of FIG. 5. Similarly, there are four data slots 410, 420, 430, 440, which can be designated by two bit addresses in a similar manner to the data slots 310, 320, 330, 340 of FIG. 5. However, there is no "latest" information 360 in the header 350B in this embodiment. Instead, there is a portion of each data slot 415, 425, 435, 445 designated for a counter value (which could also be considered a timestamp). The portion of the data slot designated for a counter value 415, 425, 435, 445 may be the final portion, e.g. the final 32 bits, or the final 64 bits.

The counter values may be useable to indicate the "latest" information 370. In other words, by reading and comparing the counter values for each data slot, the host 100 may be able to determine which pair of slots has been written to most recently, and which slot of each pair of slots has been written to more recently. For example, a higher counter value may indicate a more recent write action. Thus in this example, the slot with the highest counter value would be the most recently written slot, and the pair of slots containing this slot would be the pair most recently written to. The slot with the higher counter value of the other pair of slots would be the slot more recently written to for that pair of slots. Other counting systems may also be possible, for example lower counter values may indicate more recent write actions; other embodiments are also envisioned.

It should be noted that in some embodiments the counter value may have to be located in the final portion of each data slot. For example, if the counter value is not located the final portion of the data slot, e.g., if the counter value is in another portion of the data slot, such as the first portion or somewhere in the middle of the data slot, this could result in data coherency problems. That is to say, if a data slot were to contain data after the counter value, the host could read a newly written counter value in a data slot, determine that the slot containing the newly written counter value is the most recently written to slot, and read the data in that data slot, all before that data slot (e.g., the portion of the data slot after the counter value) had been fully written. This could therefore result in the host reading incoherent data; thus, data coherency requirements may necessitate that the counter value be the last portion written to in any write operation including a counter value.

FIGS. 7A-7D—Counter Values According to Various Embodiments

According to some embodiments, the counter value may be the last 64 bits of each data slot. These 64 bits may be written as two 32 bit words. Thus in some embodiments it may be important to ensure that even if the host 100 reads the counter values to determine the location of the most recently written data while the client 150 is writing a new counter value to the data slot which it has just written, the host will still read data which is coherent and which is the most recently fully written data. If the counter value is written in little-endian format, this is assured. FIGS. 7A-7D illustrate the various cases. In each figure, the "Last Frame" 702 refers to a counter value previous to the write. "New Frame (intermediate)" 704 refers to a counter value after the second word of the counter has been updated and before the first word of the counter has been updated. "New Frame (final)" 706 refers to a new counter value in its entirety such as it would read after the client is finished writing to that slot.

Figure 7A:
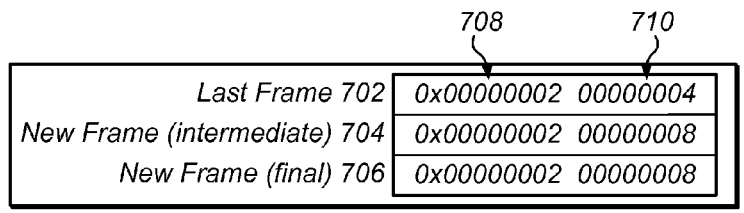
FIGS. 7A, 7B, 7C, and 7D depict representations of counter values according to various embodiments.

FIG. 7A depicts the case where the first word 708 of the counter is the same in both the previous counter value 702 and the new counter value 706. In this case, the counter would correctly indicate that the written-to slot was the most recently written slot if read at the intermediate stage 704.

Figure 7B:
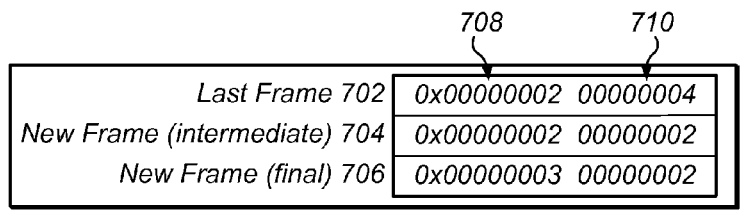

FIG. 7B depicts the case where the first word 708 of the counter is higher in the new counter value 706 than in the old counter value 702, and the second word 710 of the counter is lower in the new counter value 706 than in the old counter value 702. Thus the intermediate stage 704 reads as an older value. If the host 100 reads the counter value at this point it will consider the next-most-recently written slot as the most recently written slot. In fact this is correct since the write is not considered complete until the entire slot (including the counter value) is transferred, so logically, the host would not read old data, but would read the most recent fully complete data.

Figure 7C:
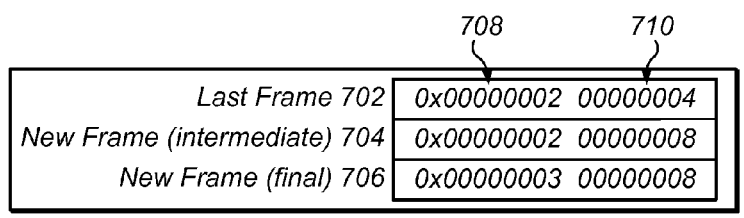

FIG. 7C depicts the case where both the first word 708 of the counter and the second word 710 of the counter are higher in the new counter value 706 than in the old counter value 702. Thus the intermediate stage 704 reads as a newer value, although not the fully correct new value. If the host 100 reads the counter value at this point it may consider this the most recently written slot, in which case it will read the new data, which is fully coherent. Alternatively the host may consider the next-most-recently written slot as the most recently written slot (if, for example, the next-most-recently-written slot has a counter value in between the intermediate value of this slot and the new counter value of this slot). In this case, as in 5B, the host 100 would read the most recent fully complete data, which is also coherent.

Figure 7D:
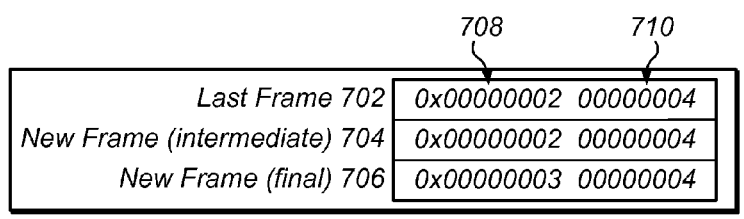

FIG. 7D depicts the case where the first word 708 of the counter is higher in the new counter value 706 than in the old counter value 702, and the second word 710 of the counter is the same in the new counter value 706 as in the old counter value 702. In this case the intermediate stage 704 will read as the old counter value 702. If the host reads the counter value at this point it will consider the next-most-recently written slot as the most recently written slot, and again as in 5B, will read the most recent fully complete data, which is fully coherent.

It should be noted that in some embodiments, for example in which data is written by a client device 150 frequently, and the counter is relatively small, e.g. 32 bits, an overflow condition could periodically occur, leading to older data being read. However, a 64 bit counter, for example, is unlikely to have this problem. A 64 bit count could be incremented 18,446,744,073,709,551,615 times before overflowing. Even if a client device 150 writes every 1 μs, this would allow at least 584,000 years before the overflow condition is reached.

Figure 8:
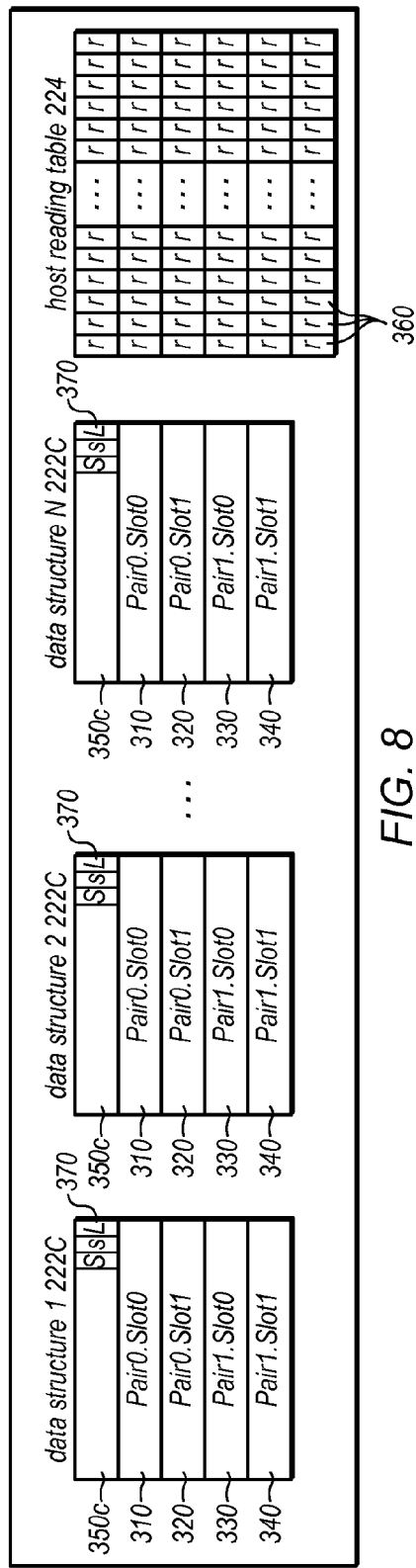
FIG. 8 depicts a representation of a plurality of data structures and a table as might be stored in a host memory according to one embodiment.

FIG. 8—A Plurality of Data Structures and a Table Stored in a Host Memory

FIG. 8 depicts a plurality of data structures 222C which may be stored in the host memory 220 along with a table 224 which may be stored in the host memory 220 according to one embodiment. There may be any number of data structures in the host memory, e.g., there may be N data structures, where N may be 10, 100, 1000, or any number. The data structures 222C may be similar, though in some embodiments not identical, to the data structure 222A depicted in FIG. 5; they each may include four data slots 310, 320, 330, 340 which may be designated by two bit addresses, and they each may include a header 350C with "latest" information 370.

The data structures 222C may not each include "reading" information 360 in the header 350C. Instead, there may be a separate host reading table 224 which stores the "reading" information 360 for all of the data structures 222C. The "reading" information 360 for each data structure 222C may be stored as a single bit and indicate which pair of slots has been read from most recently just as described with relation to FIG. 5. The "reading" information 360 for all of the data structures 222C may simply be stored as a single separate table 224 instead of each data structure's "reading" information 360 being included individually in the header 350C of each data structure 222C.

Figure 9:
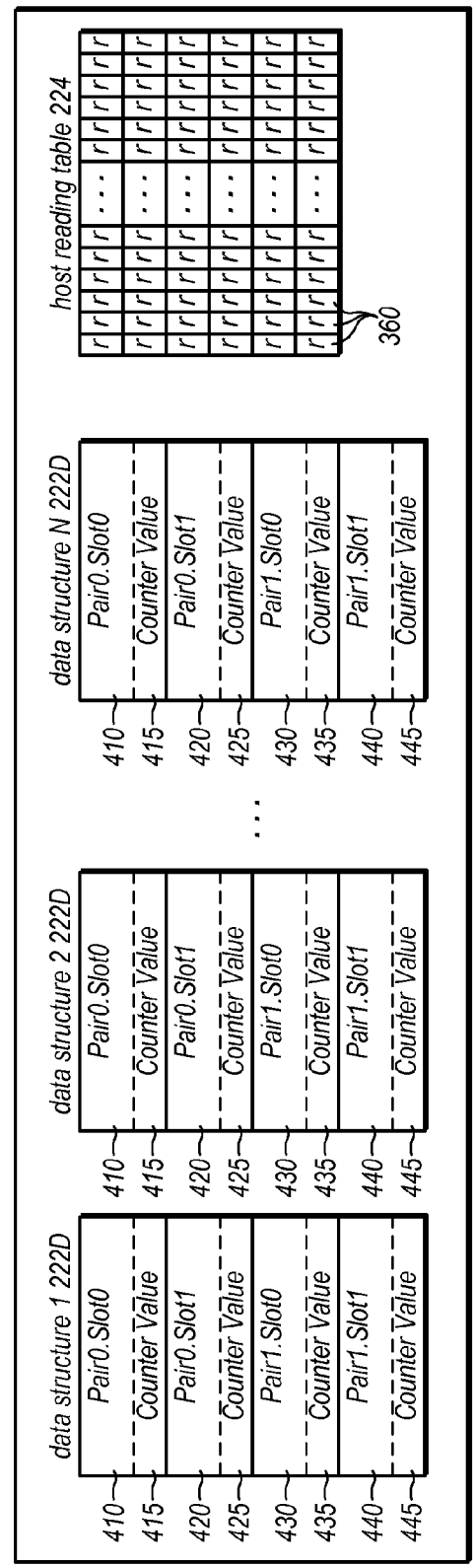
FIG. 9 depicts a representation of a plurality of data structures and a table as might be stored in a host memory according to one embodiment.

FIG. 9—A Plurality of Data Structures and a Table Stored in a Host Memory

FIG. 9 depicts a plurality of data structures 222D which may be stored in the host memory 220 along with a table 224 which may be stored in the host memory 220 according to another embodiment. There may be any number of data structures in the host memory, e.g., there may be N data structures, where N may be 10, 100, 1000, or any number. The data structures may each include four data slots 410, 420, 430, 440 which may be designated by two bit addresses, as described above with relation to the data structures of FIGS. 5, 6, and 8. As with the data structure 222B depicted in FIG. 6, each data slot may include a portion designated for a counter value 415, 425, 435, 445. The designated portion 415, 425, 435, 445 may be the final portion of each slot, e.g. the final 64 bits of each slot. The counter values for each data structure may function in all respects as those described above with respect to FIG. 6, e.g. they may be useable to indicate the "latest" information 370. The data structures 222D may not include any headers.

The table may be a host reading table 224. The host reading table 224 may function in a similar manner to the host reading table 224 depicted in FIG. 8 and described above, e.g. may include the "reading" information 360 for each data structure 222D included in the host memory 220 all in a single separate table 224.

Figure 10:
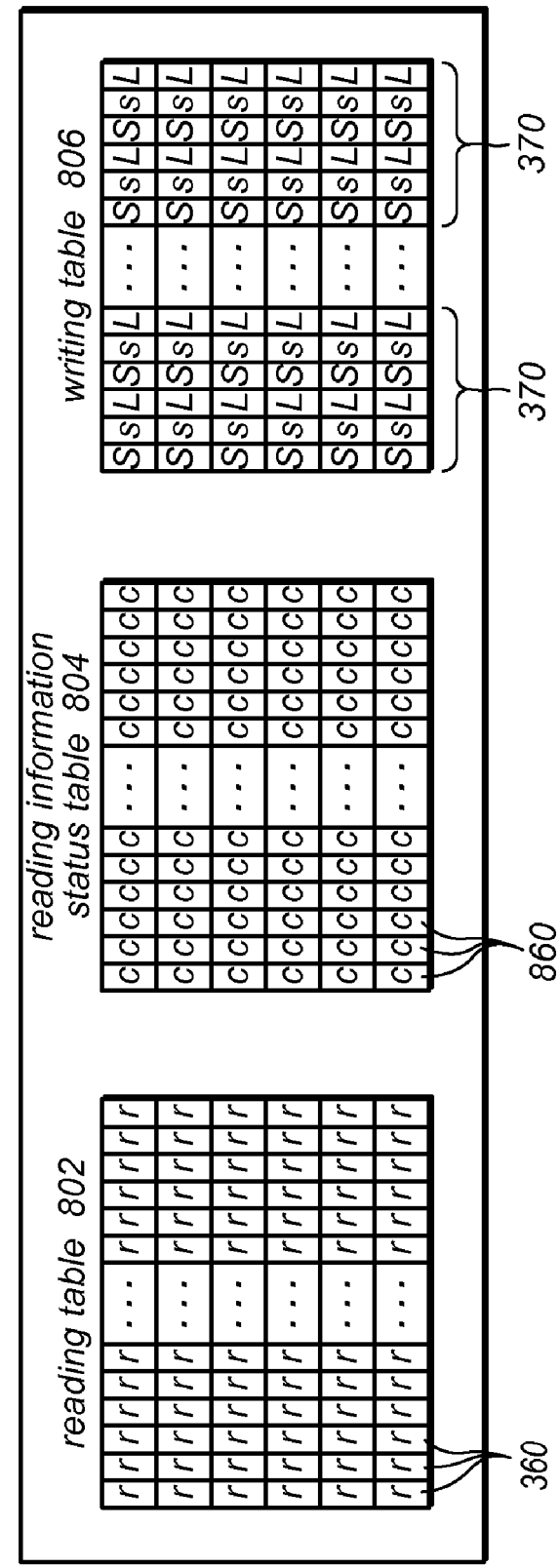
FIG. 10 depicts a representation of a plurality of tables as might be stored in a client memory according to one embodiment.

FIG. 10—A Plurality of Tables Stored in a Client Memory

FIG. 10 depicts a plurality of tables 274 as might be stored in the client memory 270 according to one embodiment. One or all of these tables may be stored in the client memory 270 according to various embodiments.

There may be a reading table 802. The reading table 802 may correspond to a host reading table 224 in the host memory 220, for example the host reading table 224 of FIG. 7 or FIG. 8. The reading table 802 in client memory 270 may be a copy of the host reading table 224 in the host memory 220, e.g. the information in the reading table 802 may be obtained or updated only by retrieving that information from the host. The reading table 802 may contain "reading" information 360 for each of a plurality of data structures in the host memory 220.

There may be a reading information status table 804. The reading information status table 804 may include "reading information status" information 860 for each data structure 222 of the plurality of data structures 222 in the host memory 220. "Reading information status" information 860 may indicate, for a given data structure 222 in the host memory 220, whether that data structure 222 has been written to since the reading table 802 was most recently updated. In other words, the "reading information status" information 860 for a given data structure 222 provides an indication that the "reading" information 360 in the reading table 802 for that data structure 222 is valid (e.g., if the data structure 222 has not been written to since the reading table 802 was most recently updated), or alternatively, provides an indication that the "reading" information 360 in the reading table 802 may not be valid (e.g., if the data structure 222 has been written to since the reading table 802 was most recently updated). Since the "reading" information 360 originates from the host 100, including this "reading information status" information on the client 150 may allow the client 150 to update the "reading" information 360 (e.g., perform a read operation) from the host 100 less frequently than without the "reading information status" information 860.

There may be a writing table 806. The writing table 806 may include "latest" information 370 for each data structure 222 in the host memory 220. The "latest" information 370 for each data structure 222 may indicate which pair of slots has been written to most recently, and which slot of each pair of slots has been written to more recently. The "latest" information 370 for each data structure 222 may include three bits, or another number of bits.

Figure 11:
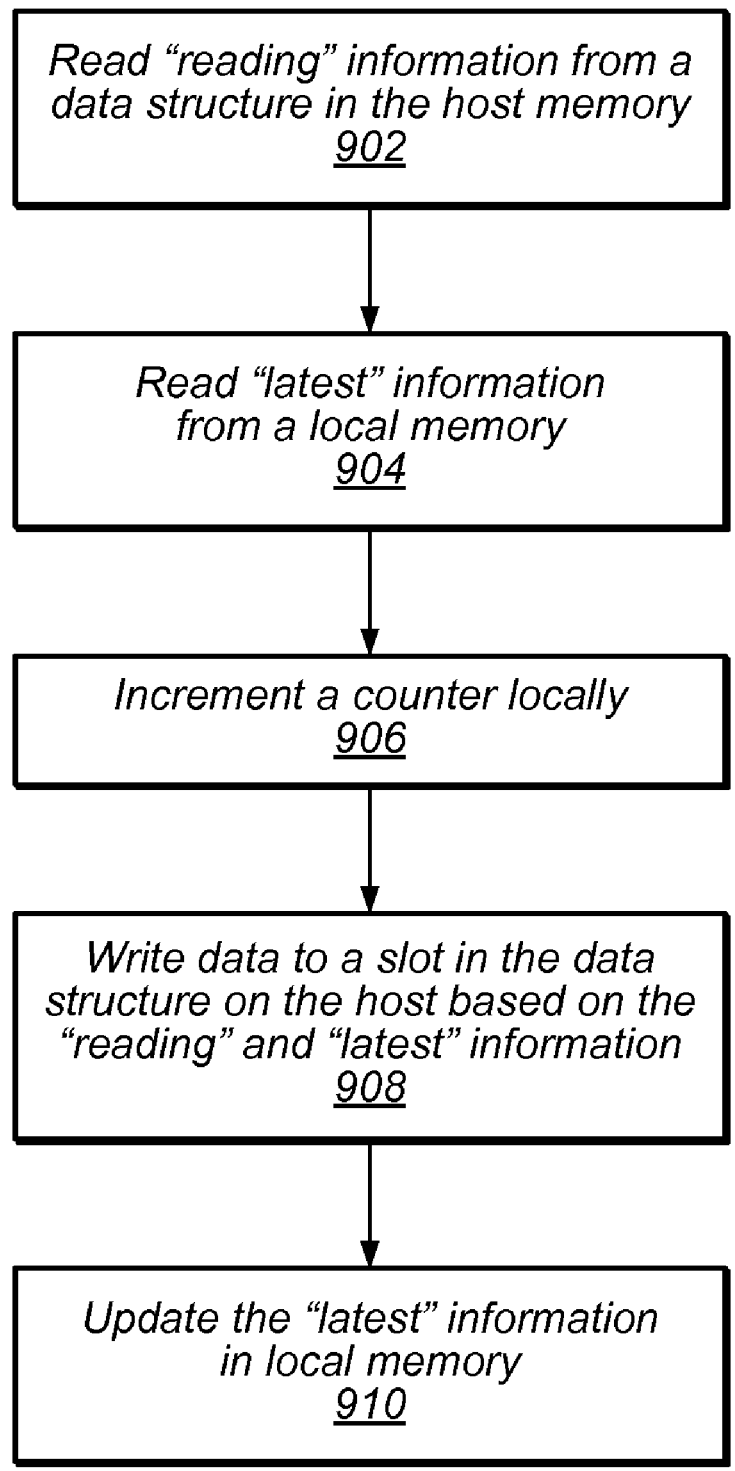
FIG. 11 is a flowchart diagram illustrating a method for a client to transfer data to a host according to one embodiment.

FIG. 11—Method for a Client Device to Transfer Data to a Host

FIG. 11 is a flowchart diagram of a method for a client device to transfer data to a host according to one embodiment. The method of FIG. 11 is intended to provide an increase in throughput of an asynchronous data transfer in a four slot communication mechanism over the method described above. The method described above may utilize three DMA operations for each data transfer (one read and two writes). In the method of FIG. 10, the two write steps are essentially combined. That is to say, instead of a separate write to a header in a data structure to provide the host with "latest" information, the method adds a counter value to the actual data written to each data slot. The counter values are useable by the host to obtain equivalent "latest" information without requiring an additional DMA write operation.

The method depicted in FIG. 11 and described below may be performed in conjunction with one or more of the systems described above and depicted in FIGS. 1 and 2. The steps of the method may be as follows.

In 902, the client device 150 may read "reading" information 360 from a data structure 222 in the host memory 220. The data structure 222 in the host memory 220 may preferably be the data structure 222B depicted in FIG. 5 and described above. Thus the "reading" information 360 may indicate which pair of slots has been read from by the host most recently.

In 904, the client device 150 may read "latest" information 370 from a local memory 270. The local memory 270 may include a writing table 806 such as the one depicted in FIG. 9. Thus the "latest" information 370 may indicate which slot of the most recently read from pair of slots has been written to most recently. Other ways of storing "latest" information in addition to or instead of a writing table are also envisioned.

In 906, the client device 150 may increment a counter locally. The counter may be stored in a local memory 270 or may be comprised in a programmable hardware element; other ways of storing the counter may also be possible. In some embodiments, the client device 150 may include one counter for all of the (one or more) data structures 222B in the host memory 220. In this case the client 150 may increment the counter before every write, e.g. before the client 150 writes to any data structure 222B in the host memory 220. Alternatively, there may be a counter in the client memory 270 for each data structure 222B in the host memory 220, and the client 150 may increment the counter only before writes to the particular data structure 222B associated with that counter. In general, the counter may be used to mark the relative order in which the slots of a data structure have been written. For example, the first slot written may have a counter value of 1. The second slot may have a counter value of 2. The third slot written may have a counter value of 3. The counter values may continue to increment sequentially with each write, thus in one example, the counter values of the slots might read 17 and 21 for the first pair, and 20 and 22 for the second pair. In this example, the second slot of the first pair has been written to more recently of the first pair, the second slot of the second pair has been written to more recently of the second pair, and the second pair has been written to most recently. Thus, the counter values may be usable to indicate which pair has been written to most recently and which slot of each pair has been written to more recently.

In 908, the client device 150 may write data to a slot in the data structure 222B in the host memory 220 based on the "reading" 360 and "latest" information 370. The slot may be the slot which has not been written to more recently of the pair of slots that has not been read from most recently. In other words, the client 150 may first determine which pair of slots the host 100 may be reading from. In order to avoid overwriting data while it is being read (which could lead to the host 100 reading incoherent data), the client 150 may choose to avoid the pair of slots which the host 100 has read from most recently. Then, the client 150 may determine which slot of the remaining pair of slots has been written to most recently. In case the host 100 finishes reading from the other pair of slots and reads the more-recently-written slot of this pair of slots before the client 150 finishes writing, the client 150 may choose to avoid the more-recently-written slot of this pair of slots. Thus, the client 150 may write to the slot which contains the oldest data in the pair of slots not currently being read from by the host 100. The data may include measurement data, for example, data collected by the client device, e.g., using a DAQ card or other means of data acquisition. The data may be another kind of data instead of measurement data, or may include measurement data and other data. The data written to the slot may include the value of the counter, for example, the counter size may be set as 64 bits, and the last 64 bits of the data written may be the value of the counter.

In 910, the client device 150 may update the "latest" information 370 in the local memory 270. The client 150 may update the "latest" information 370 to indicate that the slot which has just been written to is the most-recently-written-to slot, and the pair including that slot is the pair of slots which has been written to most recently. This may be necessary so that the client 150 has the correct information the next time the client wants to transfer data.

Figure 12A:
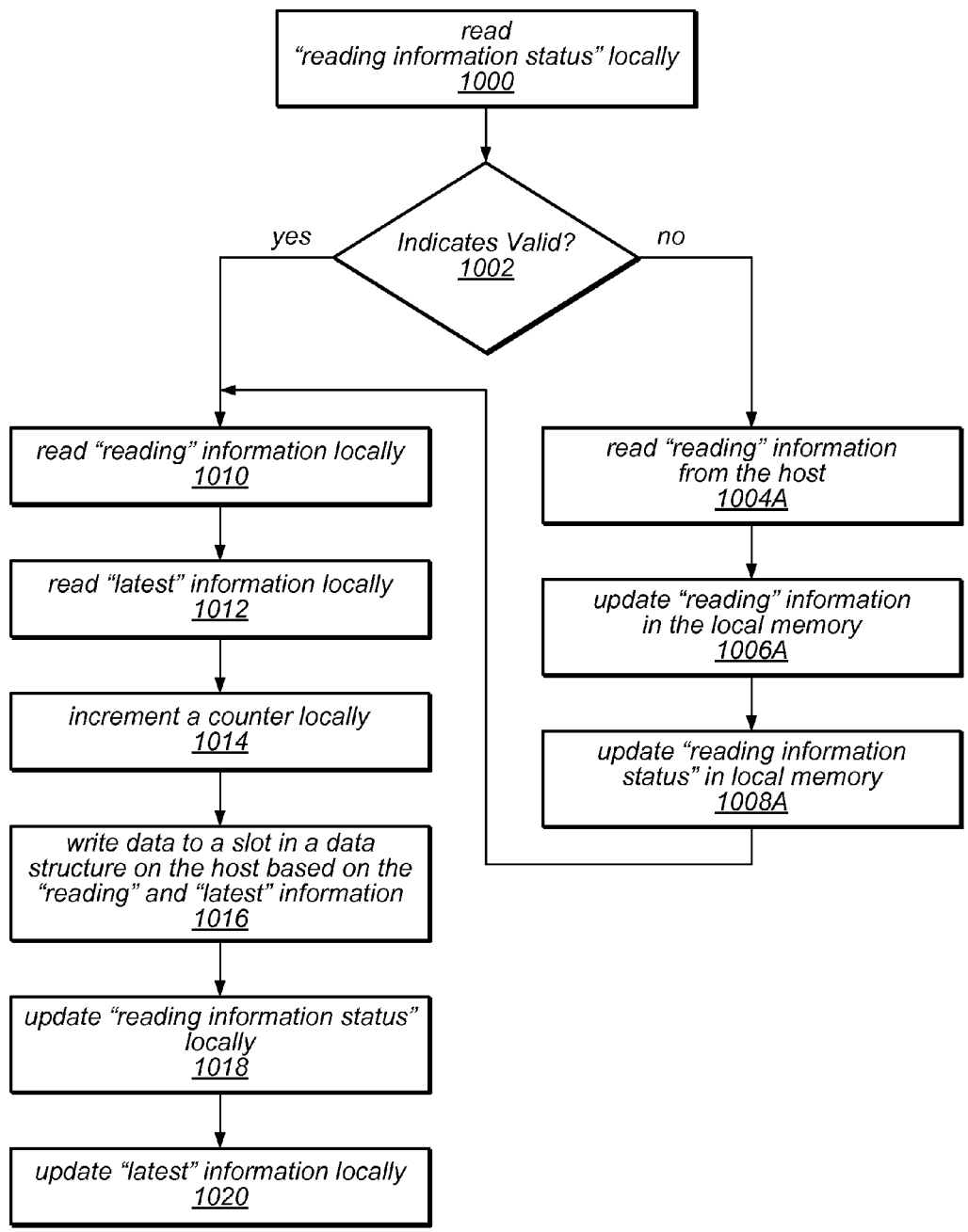
FIGS. 12A and 12B depict flowchart diagrams illustrating alternate embodiments of a method for a client to transfer data to a host.
Figure 12B:
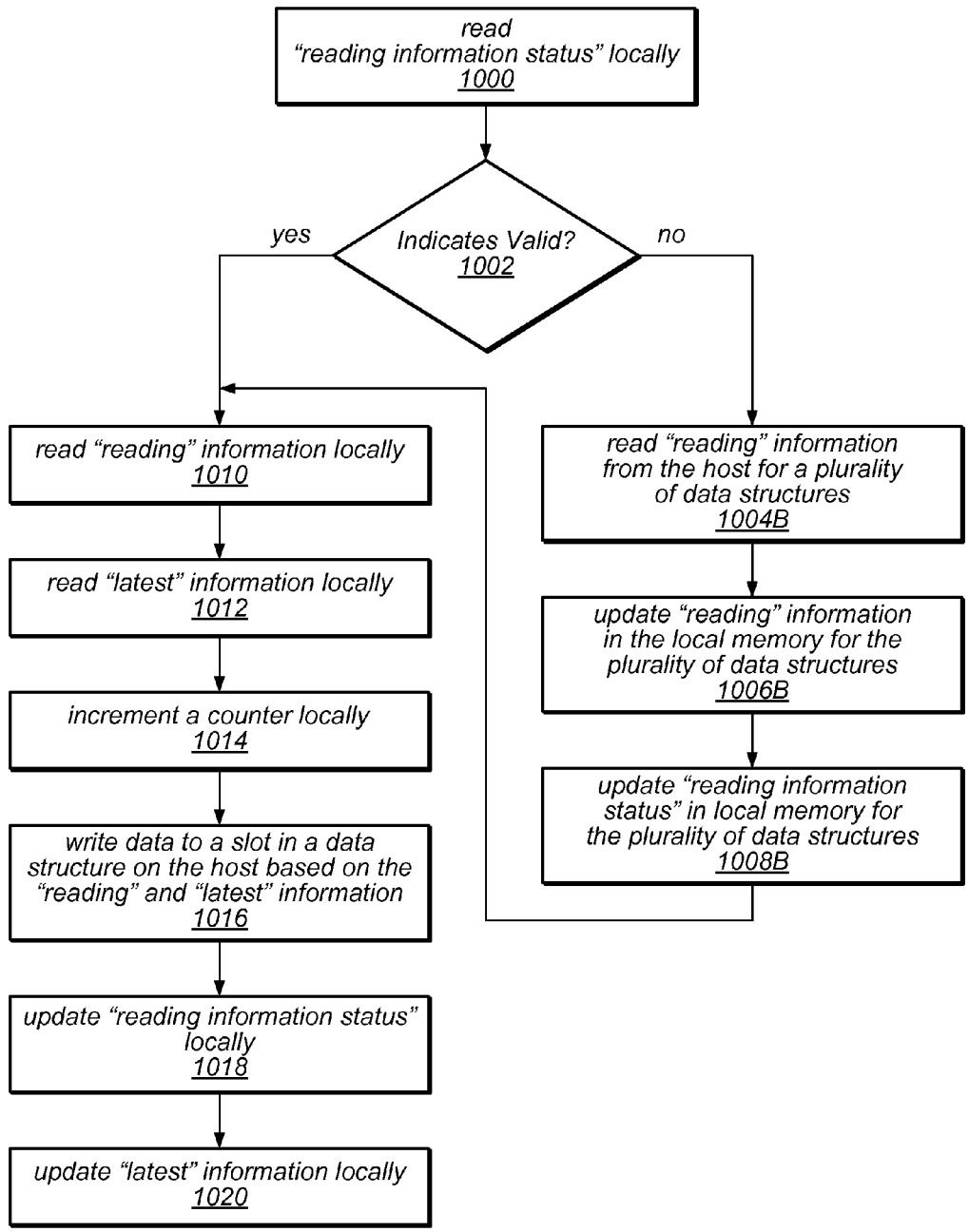

FIGS. 12A-12B—Further Embodiments of a Method for a Client Device to Transfer Data to a Host System FIGS. 12A and 12B depict flowchart diagrams illustrating further embodiments of a method for a client device to transfer data to a host system. The methods of 12A and 12B are primarily intended to decrease the overall latency of an asynchronous data transfer utilizing a four slot communication mechanism. The method depicted in FIG. 12B illustrates embodiments of a system where a host has a plurality of data structures in a host memory in which it is possible to receive data from a client device. The client may hold similar data (e.g., "reading" information) for all of the data structures in the host memory in one or more tables in the client's own memory. As long as the data in the client's memory is accurate (e.g., identical to the "reading" information set by the host and stored in the host memory), the client can use this information to determine a write location without requiring a DMA read operation to get this information from the host. The method thus includes "reading information status" information in the client memory to ensure the accuracy of the local "reading" information. In the ideal circumstances, this may allow the client to read the "reading" information for the entire plurality of data structures in the host memory once, by performing a single DMA read, then write to each of the plurality of data structures in turn without requiring another DMA read until all of the plurality of data structures have been written to. Said another way, if there were 300 data structures in the host memory, under ideal conditions this method would make one DMA read operation over the course of 300 data transfers (one transfer to each of 300 data structures), as compared to the method described above which would require 300 DMA read operations for 300 data transfers (i.e. a DMA read for every data transfer).

The method depicted in 12A illustrates essentially the same method as 12B, but for a host memory containing only a single data structure. In this system the method would still require a DMA read for every data transfer and thus its usefulness may be reduced; however, such a system may be unlikely to occur in reality, but for explanation, it has been included.

The method depicted in FIGS. 12A and 12B and described below may be performed in conjunction with one or more of the systems described above and depicted in FIGS. 1 and 2. The steps of the methods may be as follows.

In 1000, a client 150 may read "reading information status" information 860 from a local memory 270 for a data structure 222 in a host memory 220. The data structure 222 may preferably be either the data structure 222C of FIG. 8 or the data structure 222D of FIG. 9 in various embodiments. The "reading information status" information 860 may indicate that the "reading" information 360 stored in a reading table 802 in local memory 270 either is valid or may not be valid for the data structure 222.

As shown in step 1002, if the "reading information status" information 860 indicates that the "reading" information 360 is valid, the method may continue to step 1010, potentially skipping steps 1004A, 1006A, and 1008A or 1004B, 1006B, and 1008B and thereby eliminating a DMA read operation. If the "reading information status" information 860 indicates that the "reading" information 360 may not be valid, the method may continue to step 1004A or 1004B.

In 1004A the client 150 may read "reading" information 360 from the host memory 220 for the data structure 222 in the host memory 220. The "reading" information 360 in the host memory 220 may be stored in a host reading table 224. Alternatively, in 1004B, the client 150 may read "reading" information 360 from the host memory 220 for a plurality of data structures 222 in the host memory 220. For example, the client 150 may read the entire reading table 224 from the host memory 220.

In 1006A the client 150 may update the "reading" information 360 in the local memory 270 for the data structure 222. For example the client 150 may update a "reading" bit for the data structure 222 in a reading table 802 in local memory 270 to match the corresponding "reading" bit in the host reading table 224 in host memory 220. Alternatively, in 1006B, the client 150 may update the "reading" information 360 in local memory 270 for a plurality of data structures 222 in host memory 220. For example, the client 150 may update an entire reading table 802 in local memory 270 to match the entire host reading table 224 in host memory 220.

In 1008A the client 150 may update the "reading information status" information 860 in local memory 270 for the data structure 222. For example the client 150 may update a "reading information status" bit for the data structure 222 to indicate that the "reading" information 360 in local memory 270 for that data structure 222 is valid, e.g. that the data structure 222 has not been written to since the "reading" information 360 in local memory 270 has been most recently updated. Alternatively, in 1008B, the client 150 may update the "reading information status" information 860 for a plurality of data structures 222 in the host memory 220, for example, the client 150 may update an entire reading information status table 804 in local memory 270 to indicate that the "reading" information 360 for each of the plurality of data structures 222 is valid.

After step 1008A or 1008B, the "reading information status" information 860 may indicate that the "reading" information 360 for that data structure 222 is valid. The condition for step 1010 may thus be met and the method may therefore continue with step 1010.

In step 1010, the client 150 may read "reading" information 360 in local memory 270 for the data structure 222 in the host memory 220. The "reading" information 360 may be stored in a reading table 802 in the local memory 270, e.g. along with "reading" information 360 for a plurality of other data structures 222 in the host memory 220. The "reading" information 360 for that data structure may indicate which pair of slots has been read from most recently.

In step 1012, the client 150 may read "latest" information 370 in local memory 270 for the data structure 222 in the host memory 220. The "latest" information 370 may be stored in a writing table 806 in the local memory 270, e.g. along with "latest" information 370 for a plurality of other data structures 222 in the host memory 220. The "latest" information 370 for that data structure may indicate which slot of each pair of slots has been written to most recently.

In 1014, the client 150 may increment a counter locally. The counter may be similar or identical to any of the above described counters. The counter may be incremented to a latest value. Alternatively, in some embodiments there may not be a counter on the client 150, and this step may be skipped.

In 1016, the client 150 may write data to a slot in the data structure 222 in the host memory 220 based on the "reading" information 360 and the "latest" information 370. The slot may be the slot which has not been written to most recently of the pair of slots that has not been read from most recently. The data may include measurement data, for example, data collected by the client device 150, e.g., using a DAQ card or other means of data acquisition. The data may be another kind of data instead of measurement data, or may include measurement data and other data. The data may include the latest value of the counter, thus effectively including a form of "latest" information 370 in the data structure for the host to use. The value of the counter may be written as the last portion of the data, for example, the size of the counter value may be set as 64 bits, and the last 64 bits of the data may be the value of the counter.

In 1018, the client 150 may update the "reading information status" information 860 in local memory 270. This may include updating a "reading information status" bit in a reading information status table 804 to indicate that the data structure 222 has been written to since the "reading" information 360 in the local memory 270 (e.g. in a reading table 802) has been most recently updated. In this way, the client 150 may ensure that the client 150 will update its "reading" information 360 the next time it wants to transfer data to that data structure, if it hasn't done so in the course of transferring data to another data structure before then.

In 1020, the client 150 may update the "latest" information 370 in local memory 270. This may include updating the "latest" bits in a writing table 806 to reflect the location of the write operation just performed.

In some embodiments, e.g., where there is no counter and the data written does not include a latest counter value, there may be an additional DMA write operation required, e.g. to write the "latest" information 370 to a header of the data structure, for example if the data structure 222 is the data structure 222C of FIG. 8.

Various embodiments of data structures, tables, and methods for a client to transfer data to a host have been presented. It should be noted that an optimal embodiment may include a transfer according to the method of FIG. 12B into a host memory as shown in FIG. 9, supported by the tables shown in FIG. 9 in the client memory. This may combine the throughput increase provided by utilizing a counter (thereby eliminating a DMA write operation) with the latency decrease provided by storing a copy of the "reading" information for a plurality of data structures in the client memory (thereby eliminating a DMA read operation under normal conditions). In this case, where the host has a plurality of data structures, a best case scenario would allow most data transfers from the client to require only a single DMA write. That is, the initial DMA read and the final DMA write required by the method described above may be unnecessary in this system for most data transfers. As a large portion of the time associated with asynchronous data transfer is often overhead associated with each DMA operation, cutting out two of the three DMA steps, although it may in some embodiments introduce additional overhead for the remaining DMA step, may result in a significant increase in throughput and decrease in latency over the method described above.

Figure 13:
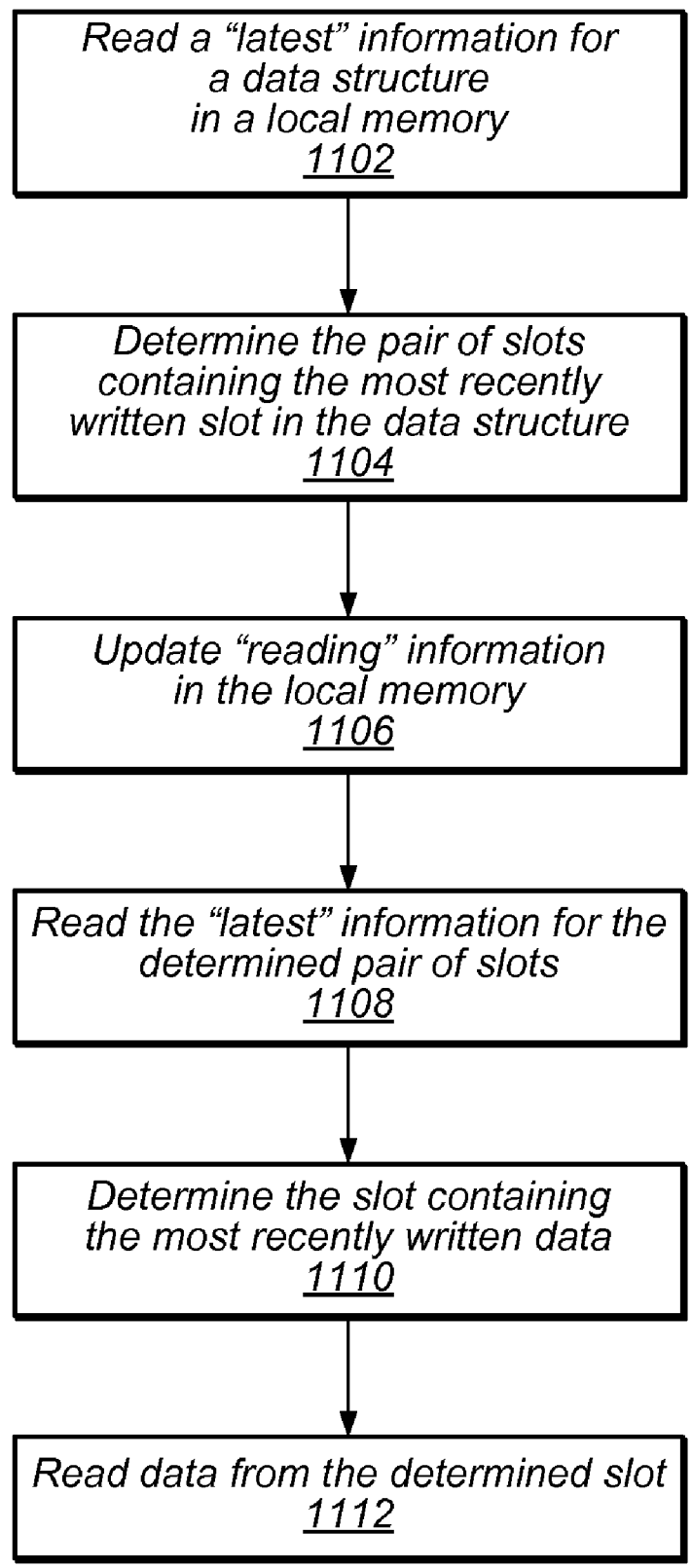
FIG. 13 depicts a flowchart diagram illustrating a method for a host to determine a location of most recently transferred data according to one embodiment.

FIG. 13—Method for a Host to Determine a Location of Most Recently Transferred Data FIG. 13 depicts a flowchart diagram illustrating a method for a host to determine a location of most recently transferred data according to various embodiments. Embodiments of the method may be used in association with one or more of the methods described above for a client to transfer data to a host; for example the most recently transferred data whose location the host determines in this method may have been transferred to the host according to one of the methods for a client device to transfer data to a host system.

The method depicted in FIG. 13 and described below may be performed in conjunction with one or more of the systems described above and depicted in FIGS. 1 and 2. The steps of the methods may be as follows.

In 1102 a host 100 may read "latest" information of a data structure 222 in a local memory 220. The data structure 222 may be a four slot data structure 222 and may or may not include a header, which may include "reading" and/or "latest" information as variously previously described according to different embodiments. In one embodiment the "latest" information for the data structure may be included as a counter value for each slot of that data structure. The counter value for each slot may provide an indication of how recently the data was written, for example, a slot with a highest counter value may have been written to most recently. Alternatively the data structure 222 may include a header including "latest" information 370 and the host 100 may read the "latest" information 370 from the header In this case the data structure 222 may not include counter values for each slot of the data structure.

In 1104 the host 100 may determine the pair of slots containing the most recently written slot of in the data structure 222. The host 100 may make this determination based on having read the counter value for each slot; for example, the host 100 may determine that the pair of slots containing the slot with the highest counter value may have been written to most recently. Alternatively, if the data structure includes a header including "latest" information 370 and the host 100 reads the "latest" information 370 instead of the counter values for each slot, the host 100 may make the determination of the pair of slots based on the "latest" information 370 read from the header of the data structure 222.

In 1106 the host 100 may update "reading" information 360 in the host memory 220. The "reading" information 360 may be in a header in the data structure 222 as in the data structure 222B of FIG. 6. Alternatively the "reading" information 360 may be in a table such as the host reading table 224 of FIG. 9. The host 100 may update the "reading" information 360 to indicate that it is reading from the pair determined to contain the most recently written data. The host may need to update the "reading" information 360 in order to ensure full coherence, e.g., to ensure that the client device 150 doesn't write over the slot from which the host 100 will read while the host is reading from that slot.

In 1108 the host 100 may read the "latest" information for the determined pair of slots. This may include reading the counter value for each slot in the determined pair of slots. Although the host 100 may have already read the counter values for each slot, it may be necessary to read the counter values of the determined pair again after updating the "reading" information 360 to ensure the data coherency of the data to be read and to avoid any potential problems such as race conditions with the client 150 that might otherwise develop if the host 100 simply used the previously read counter values. Alternatively, as noted above, the data structure 222 may include a header including "latest" information 270 and the host 100 may read the "latest" information 270 from the header instead of reading the counter values for each slot. Again, in this embodiment, there may not be counter values for each slot of the data structure.

In 1110 the host 100 may determine the slot containing the most recently written data. The host 100 may make this determination based on the counter values read after updating the "reading" information 360, e.g. the counter values read in step 1108. As noted, this may help ensure data coherency and avoid race conditions with the client 150 as it performs any write operations. The determined slot may be the slot which has been written to most recently, as indicated by the counter value for that slot. Again, alternatively, if the data structure 222 includes a header including "latest" information 370 and the host 100 reads the "latest" information 370 instead of the counter values for each slot, the host 100 may make the determination of the slot based on the "latest" information 370 read from the header of the data structure 222.

In 1112 the host 100 may read data from the determined slot. The data itself may be measurement data, instrument data, or generally any kind of data where only the most recent set of data need be available to the host system 100. The data may include data in addition to the counter value, that is, the counter value may not be the only data read by the host.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
a device receiving measurement data from a plurality of data sources, wherein at least a subset of the plurality of data sources are configured to perform measurements to generate at least a portion of the measurement data;
the device transferring at least a portion of the measurement data to a memory medium of a host coupled to the device, wherein said transferring is performed without an initiation of the transfer by the host, and wherein said transferring comprises, for each of the plurality of data sources:
determining a portion of the memory medium corresponding to the data source, wherein the portion of the memory medium is dedicated to the data source;
determining a latest value for the data source from the measurement data; and
storing the latest value for the data source in the portion of the memory medium, wherein said storing the latest value comprises overwriting a previous value of the data source when the previous value exists in the portion of the memory medium, wherein the stored data is used by the host to perform a real time application.

2. The method of claim 1, wherein said transferring is performed using direct memory access (DMA).

3. The method of claim 1, wherein, for at least one of the plurality of data sources, said storing is performed at least two times before the host reads the latest value for the at least one data source.

4. The method of claim 1, wherein said receiving the measurement data and said transferring the at least a portion of the measurement data is performed a plurality of times.

5. The method of claim 1, wherein said storing the latest value utilizes a four slot data structure in the portion of the memory medium.

6. The method of claim 1, wherein at least one of the plurality of data sources comprises a sensor.

7. The method of claim 1, wherein the device comprises a peripheral component interconnect (PCI) card.

8. The method of claim 7, wherein the device comprises a PCI eXtensions for Instrumentation (PXI) card.

9. The method of claim 1, wherein the device comprises a FlexRay device.

10. The method of claim 1, wherein the device comprises a controller area network (CAN) device.

11. A device, comprising:
a plurality of inputs for receiving measurement data from the plurality of data sources, wherein at least a subset of the plurality of inputs receive measurement data obtained from measurements performed by respective ones of the data sources;
at least one output for providing acquired data to a host coupled to the device;
wherein, during operation, the device:
receives the measurement data from the plurality of data sources via the plurality of inputs; and
transfers at least a portion of the measurement data to a memory medium of the host via the at least one output, wherein said transferring comprises, for each of the plurality of data sources:
determining a portion of the memory medium corresponding to the data source, wherein the portion of the memory medium is dedicated to the data source;
determining a latest value for the data source from the measurement data; and
storing the latest value for the data source in the portion of the memory medium, wherein said storing the latest value comprises overwriting a previous value of the data source when the previous value exists in the portion of the memory medium, wherein the stored data is used by the host to perform a real time application.

12. The device of claim 11, further comprising:
a direct memory access (DMA) system, wherein the device uses the DMA system during operation to perform said storing.

13. The device of claim 11, wherein, for at least one of the plurality of data sources, said storing is performed at least two times before the host reads the latest value for the at least one data source.

14. The device of claim 11, wherein said receiving the measurement data and said transferring the at least a portion of the measurement data is performed a plurality of times.

15. The device of claim 11, wherein said storing the latest value utilizes a four slot data structure in the portion of the memory medium.

16. The device of claim 11, wherein at least one of the plurality of data sources comprises a sensor.

17. The device of claim 11, wherein the device comprises a peripheral component interconnect (PCI) card.

18. The device of claim 17, wherein the device comprises a PCI eXtensions for Instrumentation (PXI) card.

19. The device of claim 11, wherein the device comprises a FlexRay device.

20. The device of claim 11, wherein the device comprises a controller area network (CAN) device.

21. The method of claim 1, wherein the device is a data acquisition device.

22. The method of claim 1,
wherein the device receiving measurement data from a plurality of data sources comprises the device receiving measurement data from a plurality of sensors.

23. The device of claim 11, wherein the device is a data acquisition device.

24. The device of claim 11,
wherein the plurality of inputs receive measurement data obtained from measurements performed by respective sensors.

* * * * *